United States Patent
Nicholson (10) Patent No.: US 9,829,648 B2
(45) Date of Patent: Nov. 28, 2017

(54) OPTICAL FIBER CURING OVEN

(71) Applicant: Anthony Nicholson, Roswell, GA (US)

(72) Inventor: Anthony Nicholson, Roswell, GA (US)

(*) Notice: Subject to any disclaimer, the term of this patent is extended or adjusted under 35 U.S.C. 154(b) by 295 days.

(21) Appl. No.: 14/873,170

(22) Filed: Oct. 1, 2015

(65) Prior Publication Data

US 2016/0097905 A1 Apr. 7, 2016

Related U.S. Application Data

(60) Provisional application No. 62/058,270, filed on Oct. 1, 2014.

(51) Int. Cl.
*H05B 1/02* (2006.01)
*G02B 6/38* (2006.01)

(52) U.S. Cl.
CPC ......... *G02B 6/3861* (2013.01); *G02B 6/3898* (2013.01)

(58) Field of Classification Search
CPC .... G02B 6/3861; G02B 6/3898; H05B 1/023; H05B 1/0233; H05B 1/0263; H05B 3/0047
USPC ........ 219/494, 497, 490, 412–114, 391, 392, 219/402–404
See application file for complete search history.

(56) References Cited

U.S. PATENT DOCUMENTS

| | | | | |
|---|---|---|---|---|
| 5,450,679 A | * | 9/1995 | Mojden | B65G 21/2018 198/345.1 |
| 5,778,766 A | * | 7/1998 | Wang | A21B 7/005 219/400 |
| 5,919,308 A | * | 7/1999 | Galassi | B23Q 7/035 118/322 |
| 2006/0188208 A1 | * | 8/2006 | Carberry | G02B 6/3833 385/134 |
| 2009/0266807 A1 | * | 10/2009 | Valliappan | F27B 17/0025 219/391 |

* cited by examiner

*Primary Examiner* — Mark Paschall (57) ABSTRACT

An optical fiber curing oven is used in the termination process of optical fiber cable assemblies to bond an optical fiber to a ferrule. The optical fiber curing oven includes an oven housing and a processor housing. A mounting plate is mounted inside the oven housing and is used to hold a fiber-mounting block. The mounting plate is connected to a fulcrum which allows the mounting plate to be tilted. Angling the mounting plate is useful in some curing applications. The fiber-mounting block attaches to the mounting plate and is used to secure optical fibers during the curing process. A heating element is embedded into the mounting plate and is used to heat the mounting block and cure epoxy that has been applied to an optical fiber. A control unit is included within the processor housing and is used to regulate the curing process.

12 Claims, 11 Drawing Sheets

SECTION A-A

OPTICAL FIBER CURING OVEN

The current application claims a priority to the U.S. Provisional Patent application Ser. No. 62/058,270 filed on Oct. 1, 2014.

FIELD OF THE INVENTION

The present invention relates generally to an oven, more particularly, a curing oven for optical fibers. The present invention enables a user to perform automated fiber optic connector curing operations at varying temperatures, and alignments.

BACKGROUND OF THE INVENTION

Curing ovens are often used to harden or cure epoxy that is used to connect a ferrule to an optical fiber during the termination process of manufacturing optical fiber cable assemblies. Common curing ovens are effective at accomplishing this task but can be limited in their versatility. Moreover, common curing ovens require frequent human involvement in order to ensure a successful cure. As a result, it can be difficult to manage multiple curing operations across various machines. Moreover, many curing ovens are only compatible for curing optical fibers in one orientation. This further limits the applications for said curing ovens.

Accordingly, there is a present need for an optical fiber curing oven which is capable of operating without excessive user involvement and may be used in a wide range of curing applications. The present invention is a curing oven which uses a user interaction system to provide a means of quickly and easily selecting options for an impending curing operation. The present invention also includes a plurality of network connection ports and a plurality of data transfer ports to allow different curing settings to be uploaded to the present invention and providing the ability to connect one or more optical fiber curing ovens to a central computer where all of the optical fiber curing ovens may be monitored simultaneously. Further, the present invention is compatible with horizontal and vertical curing arrangements, and may adjusted to meet the needs of individual users or manufacturers.

DETAILED DESCRIPTION OF THE INVENTION

All illustrations of the drawings are for the purpose of describing selected versions of the present invention and are not intended to limit the scope of the present invention.

Figure 1:
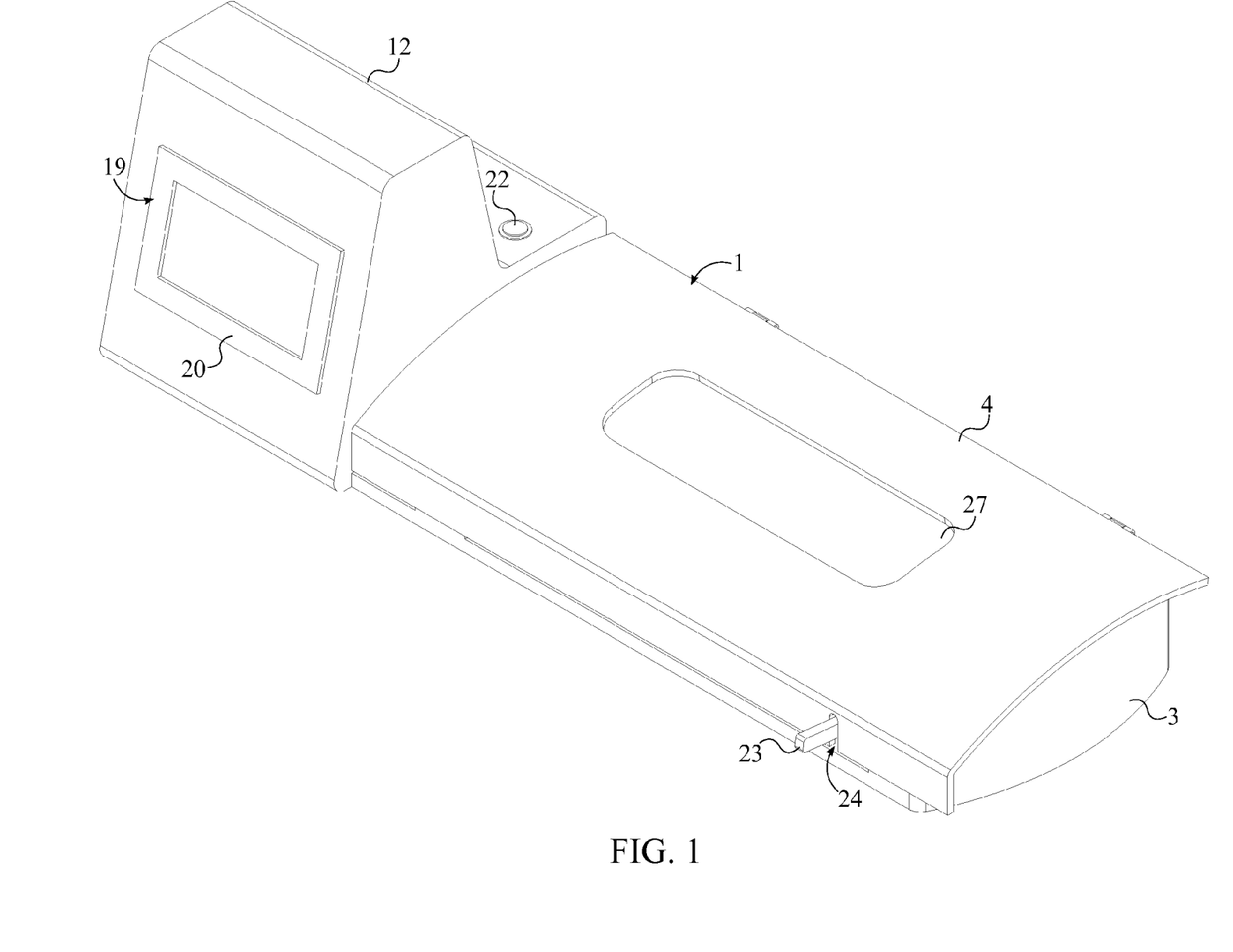
FIG. 1 is a perspective view of the present invention.
Figure 2:
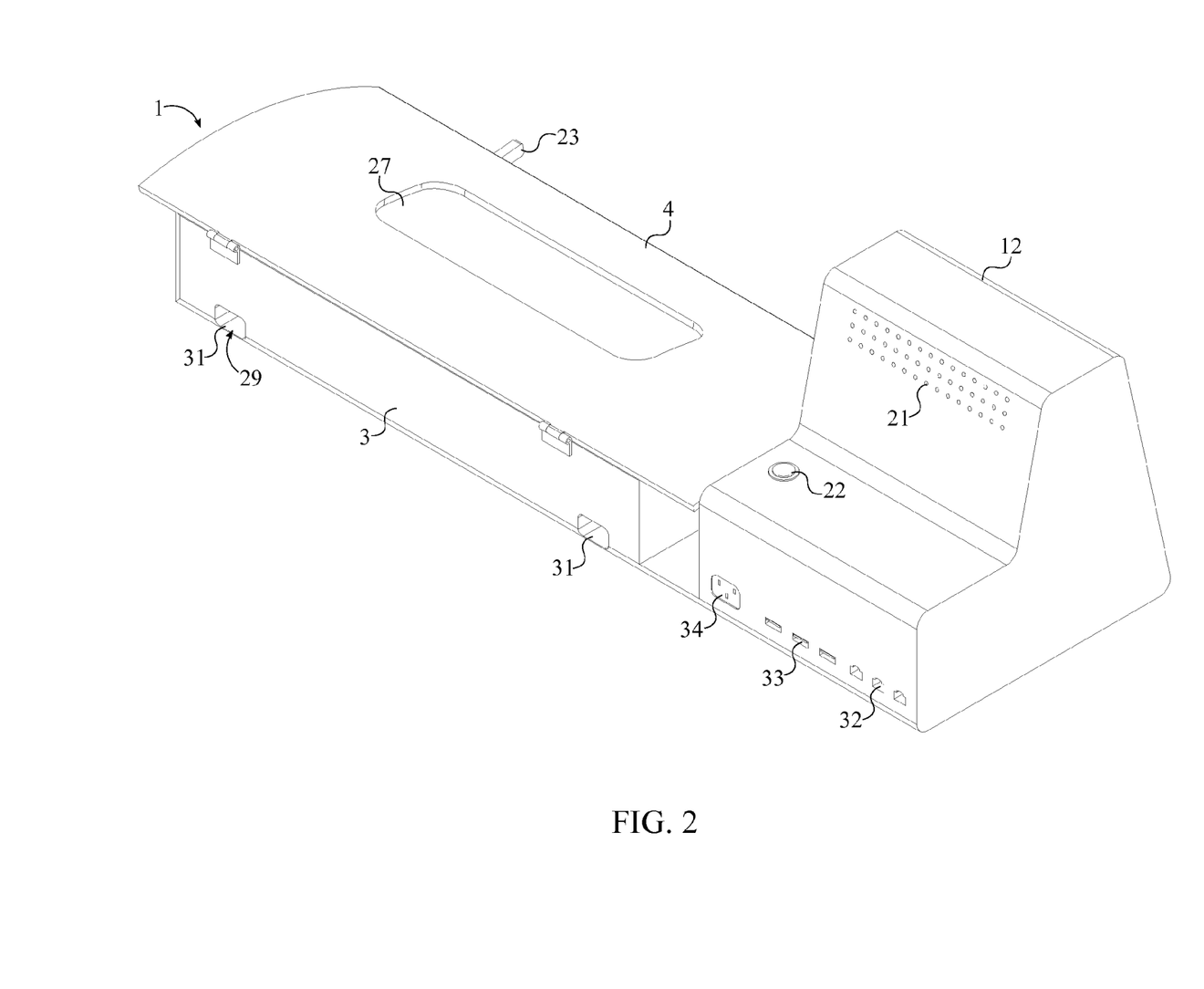
FIG. 2 is a rear perspective view of the present invention.
Figure 8:
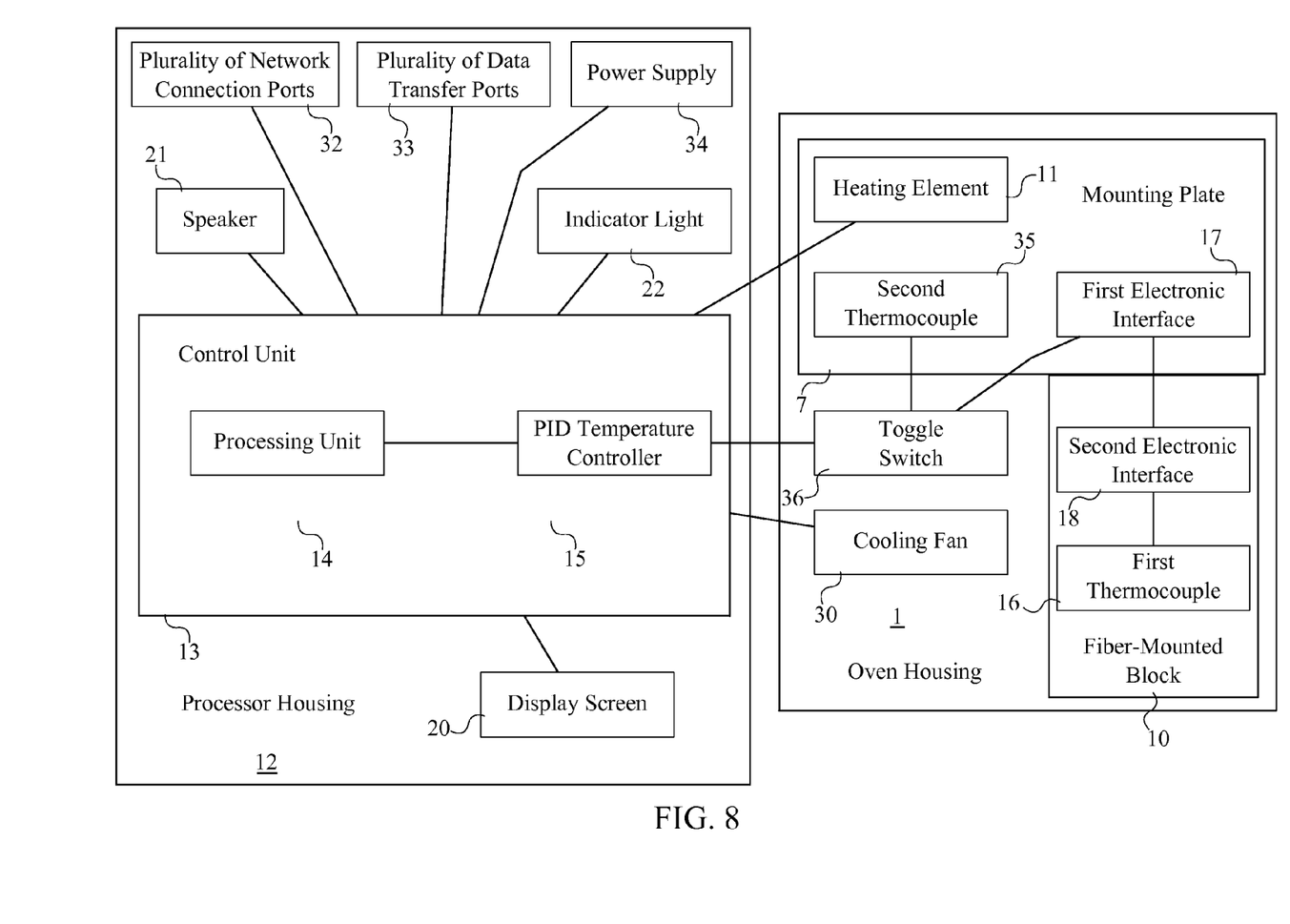
FIG. 8 is a schematic view showing the electronic and electrical connections of the present invention.

With reference to FIGS. 1-2, the present invention is an optical fiber curing oven which is used to cure the end of an optical fiber to provide a strong bond between the optical fiber and a ferrule. The present invention comprises an oven housing 1, a mounting plate 7, a fulcrum 8, a fiber-mounting block 10, a heating element 11, a processor housing 12, and a control unit 13. The oven housing 1 is used to provide an enclosure for optical fibers to be cured. The oven housing 1 comprises a base 2, a lateral wall 3, and a lid 4. The base 2 is perimetrically and adjacently connected to the lateral wall 3. The lid 4 is hingedly and adjacently connected to the lateral wall 3, opposite to the base 2. In reference to FIGS. 3-4, the mounting plate 7 is pivotably mounted onto the base 2 by the fulcrum 8. The mounting plate 7 is used as the main platform upon which optical fibers may be cured. The fiber-mounting block 10 is attached upon the mounting plate 7, opposite to the base 2. The fiber-mounting block 10 is used to secure an optical fiber to a ferrule so that the two may be bonded during the curing process. In the preferred embodiment of the present invention, the fiber-mounting block 10 is made from aluminum; however, other materials may alternatively be used. The fiber-mounting block 10 may be shaped to allow optical fibers to be cured vertically or horizontally within the oven housing 1. Accordingly, multiple different embodiments of the fiber-mounting block 10 may be used in the present invention. For a vertical curing configuration, an optical fiber and ferrule are placed into one the vertical holes, each of which traverses into the fiber-mounting block 10. In a horizontal mounting configuration, the optical fiber and the ferrule rest on one of the horizontal grooves, each of which traverses along the fiber-mounting block 10, opposite to the mounting plate 7. A rotation axis 9 of the fulcrum 8 is oriented parallel to the base 2. The fulcrum 8 allows the mounting plate 7 to be tilted during the curing process. Curing fibers at a slight angle is a common practice that uses gravity to ensure a good connection between the optical fiber and the ferrule. The heating element 11 is used to cure epoxy that bonds the optical fiber to the ferrule. The heating element 11 is embedded across the mounting plate 7 and is electronically connected to the control unit 13. The processor housing 12 is adjacently connected to the lateral wall 3 of the oven housing 1 and is used enclose and protect the control unit 13. The control unit 13, shown in FIG. 8, is mounted within the processor housing 12 and is used to manage the curing process of the present invention. Moreover, the control unit 13 is used to regulate communication with external computers and store data on the overall status of the present invention.

In reference to FIG. 8, the present invention further comprises a first thermocouple 16. The first thermocouple 16 is used to measure the temperature inside the oven housing 1. Temperature readings from the first thermocouple 16 are monitored by the control unit 13. The control unit 13 comprises a processing unit 14 and a proportional-integral-derivative (PID) temperature controller 15. The processing unit 14 is used to regulate all of the functions of the present invention, including network communication, managing the curing process, and recording data. The processing unit 14 is electronically coupled to the PID temperature controller 15. Together with the PID temperature controller 15, the processing unit 14 may be used to follow specific processes in order to cure the optical fibers. This may include using a step curing or ramp curing operations which involve altering the temperature within the oven housing 1 throughout the duration of the curing process. The PID temperature controller 15 is electronically connected to the first thermocouple 16 and is used to check errors in the temperature readings received from the first thermocouple 16. By constantly monitoring the temperature readings from the first thermocouple 16 and assessing the accuracy of those readings, the curing process may be kept precise. The first thermocouple 16 is embedded within the fiber-mounting block 10, which allows for more accurate temperature readings. By embedding the first thermocouple 16 into the fiber-mounting block 10, external variables, such as the temperature of the air inside the oven or the presence of a ventilation airflow, will not affect the readings from the first thermocouple 16.

Figure 9:
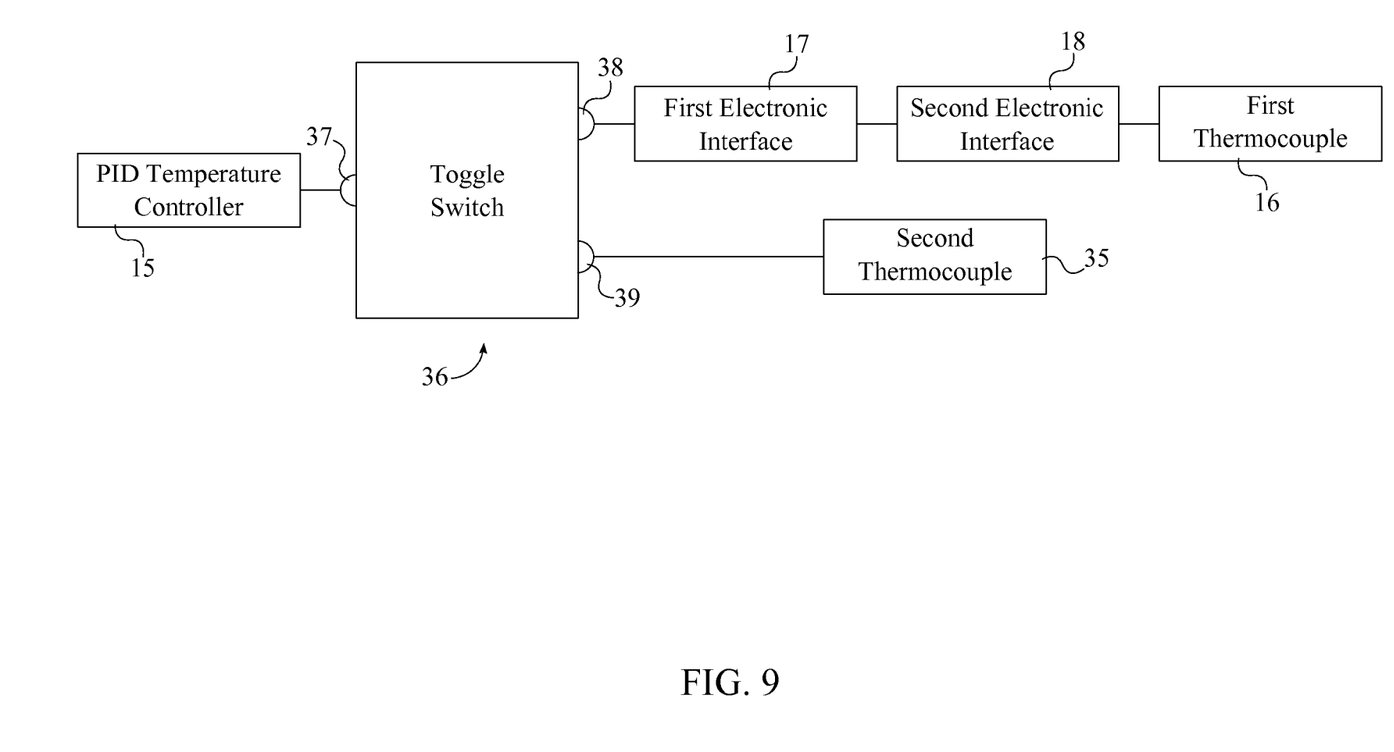
FIG. 9 is a schematic diagram showing the electronic connections of the PID temperature controller with the first thermocouple and the second thermocouple.

In reference to FIGS. 8-9, the present invention further comprises a second thermocouple 35 and a toggle switch 36. The second thermocouple 35 is embedded within the mounting plate 7 and is used to measure the temperature of the mounting plate 7. The toggle switch 36 comprises an input 37, a first output 38, and a second output 39. The toggle switch 36 allows the user to alternate between measuring the temperature of the mounting plate 7 and the fiber-mounting block 10. This is done by directing current through the first thermocouple 16 or the second thermocouple 35 depending on the preference of the user. The PID temperature controller 15 is electronically connected to the input 37. The first output 38 is electronically connected to the first thermocouple 16, while the second output 39 is electronically connected to the second thermocouple 35. Flipping the toggle switch 36 changes between using the first output 38 and the second output 39, thereby selecting between the temperature reading from the fiber-mounting block 10 or the temperature reading from the mounting plate 7.

Figure 4:
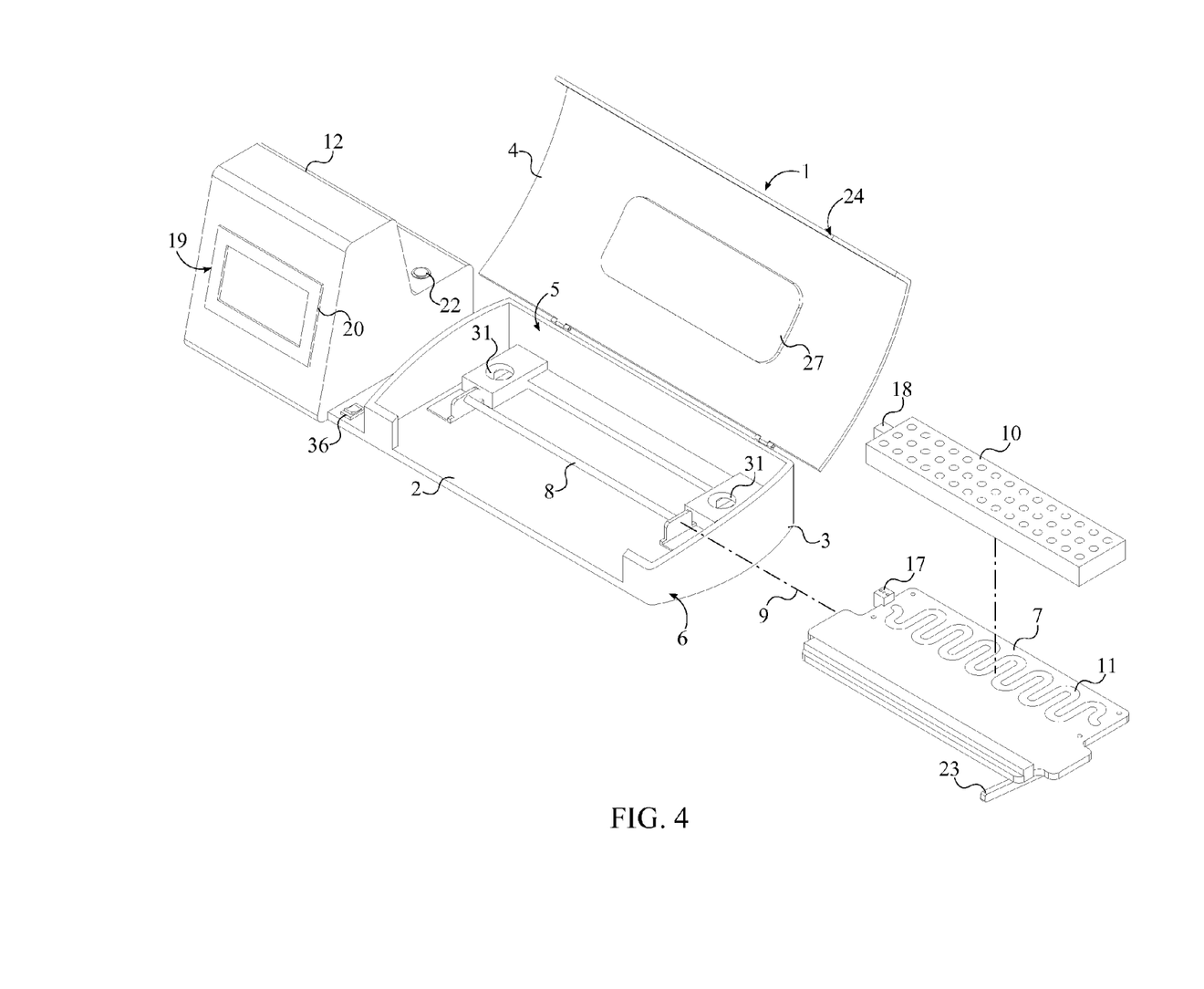
FIG. 4 is an exploded perspective view of the present invention.

In reference to FIG. 4 and FIG. 8, the present invention further comprises a first electronic interface 17 and a second electronic interface 18. The first electronic interface 17 is integrated into the mounting plate 7 and is electronically connected to the control unit 13. The second electronic interface 18 is integrated into the fiber-mounting block 10 and is electronically connected to the first thermocouple 16. The first electronic interface 17 and the second electronic interface 18 are electronically engaged to each other. This arrangement allows the first thermocouple 16 to be easily connected to the control unit 13 when the fiber-mounting block 10 is attached to the mounting plate 7. This is especially useful when swapping in and out different embodiments of the fiber-mounting block 10. As previously mentioned, the fiber-mounting block 10 may be shaped to permit a horizontal mounting arrangement of optical fibers or a vertical mounting arrangement. When switching between these two embodiments, or others, the use of the first electronic interface 17 and the second electronic interface 18 simplify the process of wiring the first thermocouple 16 to the control unit 13.

In reference to FIGS. 1-2 and FIG. 8, the present invention further comprises a user interaction system 19. The user interaction system 19 comprises a display screen 20, a speaker 21, and an indicator light 22. The display screen 20 is electronically connected to the control unit 13 allows the user to view the status of the present invention and the adjust settings. In the preferred embodiment of the present invention, the display screen 20 is a touchscreen. This allows the user to interact with the present invention without the need for buttons. The speaker 21 is electronically connected to the control unit 13 and may be used to alert users when the oven has completed the curing process or if there is an issue with the curing process. Similarly, the indicator light 22 is electronically connected to the control unit 13 and may be used to alert the user of the status of the present invention. The display screen 20, the speaker 21, and the indicator light 22 are mounted into the processor housing 12.

Figure 5:
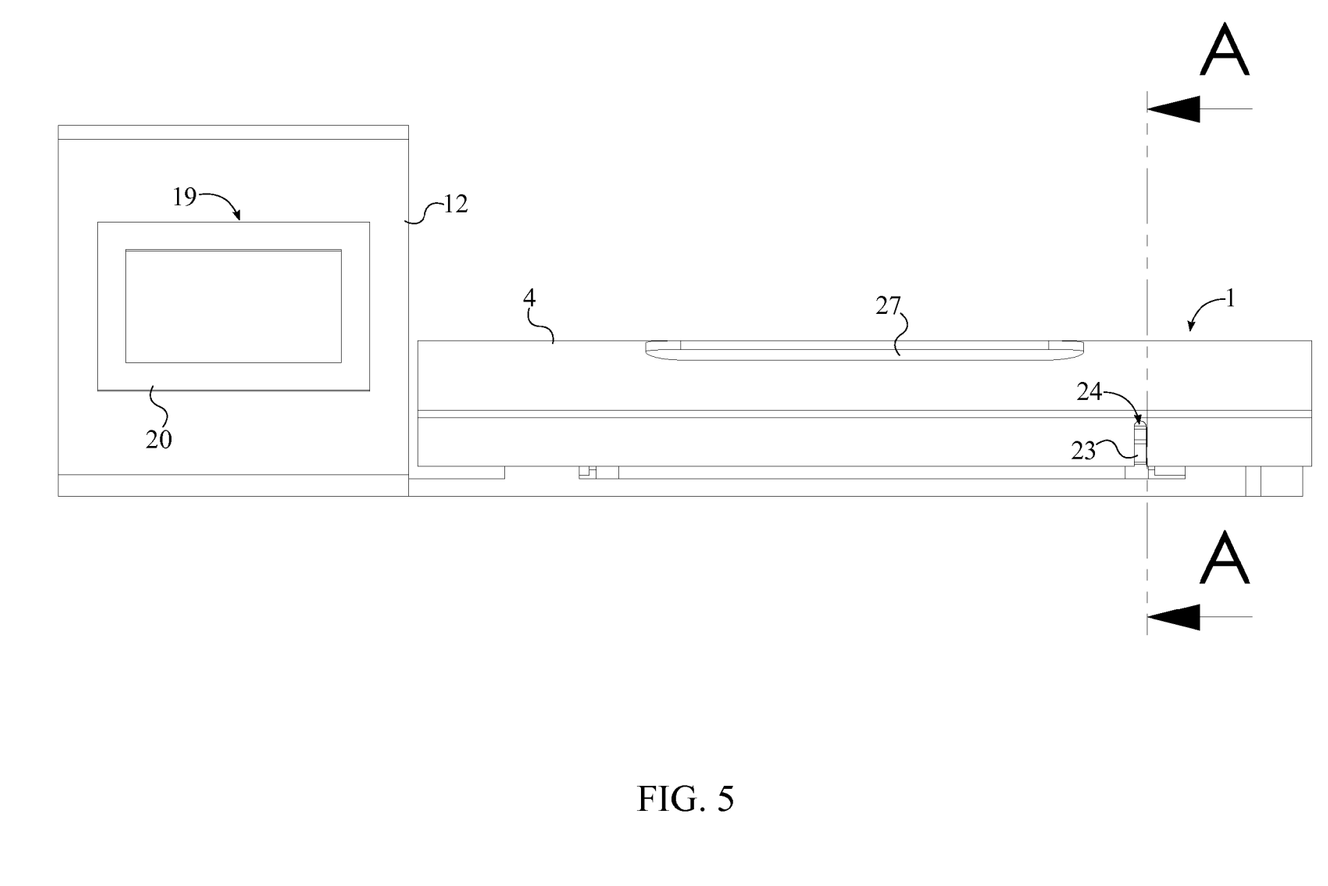
FIG. 5 is a front view of the present invention.
Figure 6:
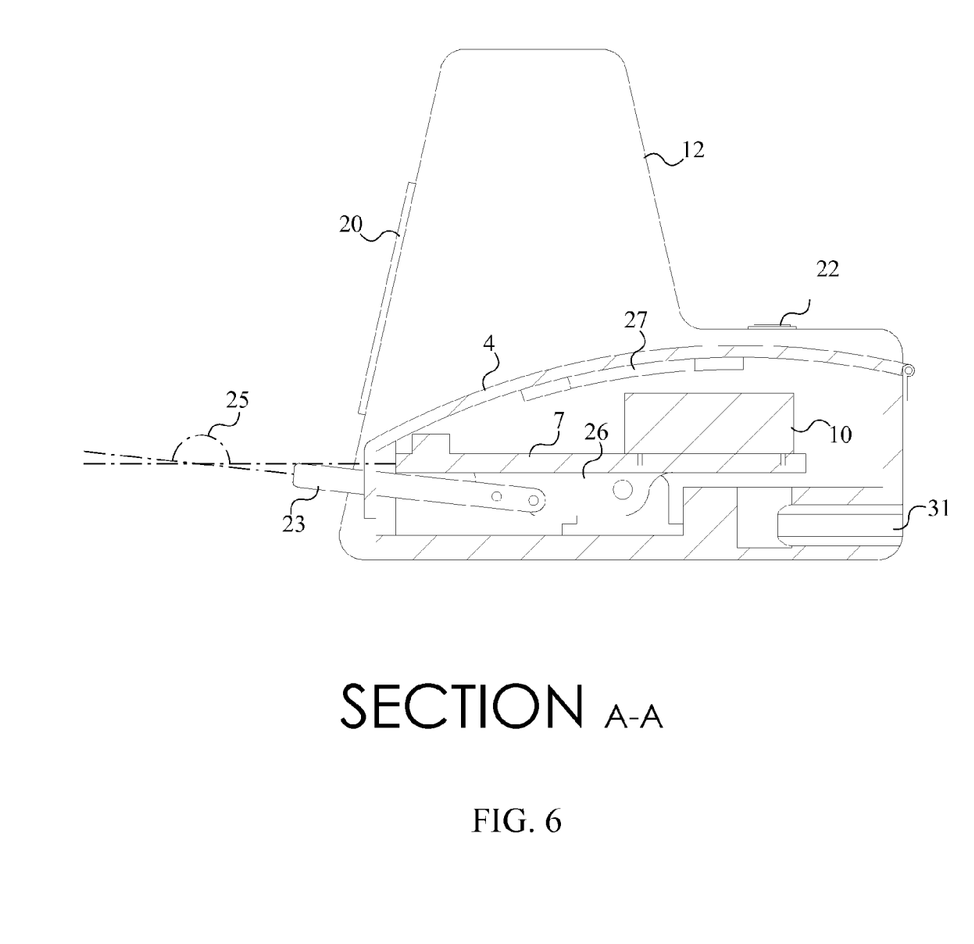
FIG. 6 is a right section view taken along the line A-A in FIG. 5.

In reference to FIGS. 5-6, the present invention comprises a tilting handle 23 and a slit 24. The tilting handle 23 is adjacently connected to the mounting plate 7 and is used to adjust the angle of the mounting plate 7. The tilting handle 23 is oriented from the mounting plate 7 at an obtuse angle 25. This arrangement allows the tilting handle 23 to provide a wider range of motion for the mounting plate 7 by not contacting the base 2 of the oven housing 1. The slit 24 traverses into the oven housing 1 and is used to prevent the tilting handle 23 from contacting the oven housing 1. The tilting handle 23 traverses through the slit 24 such that the user is able access the tilting handle 23 from outside the oven housing 1.

The present invention further comprises a rotational locking mechanism 26. The rotational locking mechanism 26 is mechanically integrated between the fulcrum 8 and the mounting plate 7 and is used to fix the angle of the mounting plate 7. When the user adjusts the mounting plate 7 by moving the tilting handle 23, the rotational locking mechanism 26 may be used to secure the mounting plate 7 such that the mounting plate 7 does not inadvertently shift during the curing process.

Figure 3:
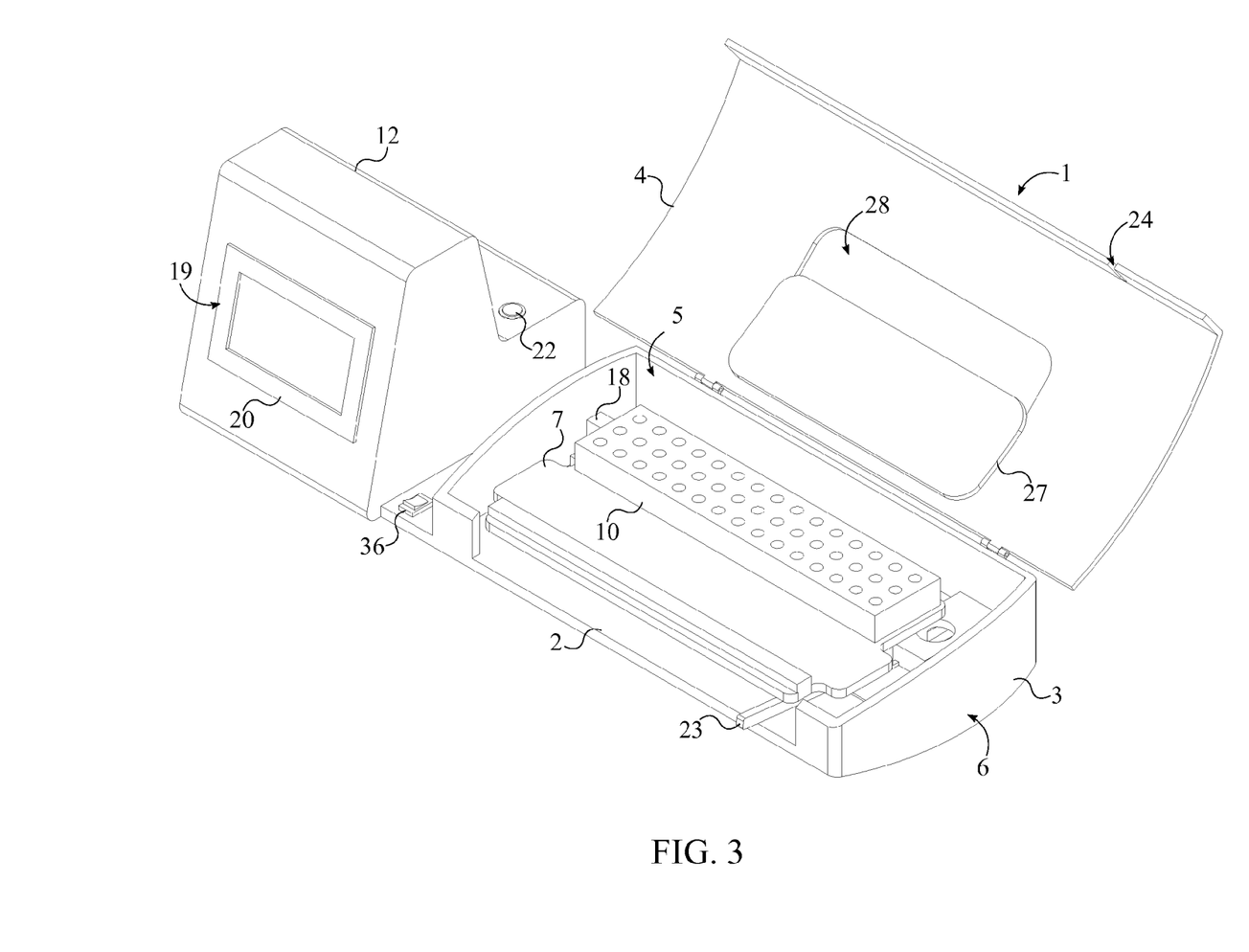
FIG. 3 is a perspective view of the present invention with the lid in an open position.

In reference to FIG. 3, the present invention further comprises an access hatch 27 and an excess fiber opening 28. The excess fiber opening 28 traverses through the lid 4 and allows a path through which one or more optical fibers may be threaded from inside the oven housing 1 to outside the oven housing 1. Because the optical fibers may be relatively long, the excess fiber opening 28 provides an outlet for the each fiber such that the entire fiber does not need to be exposed to the heat from inside the oven housing 1. The access hatch 27 is positioned adjacent to the excess fiber opening 28 and is slidably mounted against the lid 4. The access hatch 27 may be opened to allow excess lengths of fiber to be secured outside of the oven housing 1 during the curing process. Alternatively, the access hatch 27 may be closed to prevent heat from escaping through the excess fiber opening 28.

Figure 7:
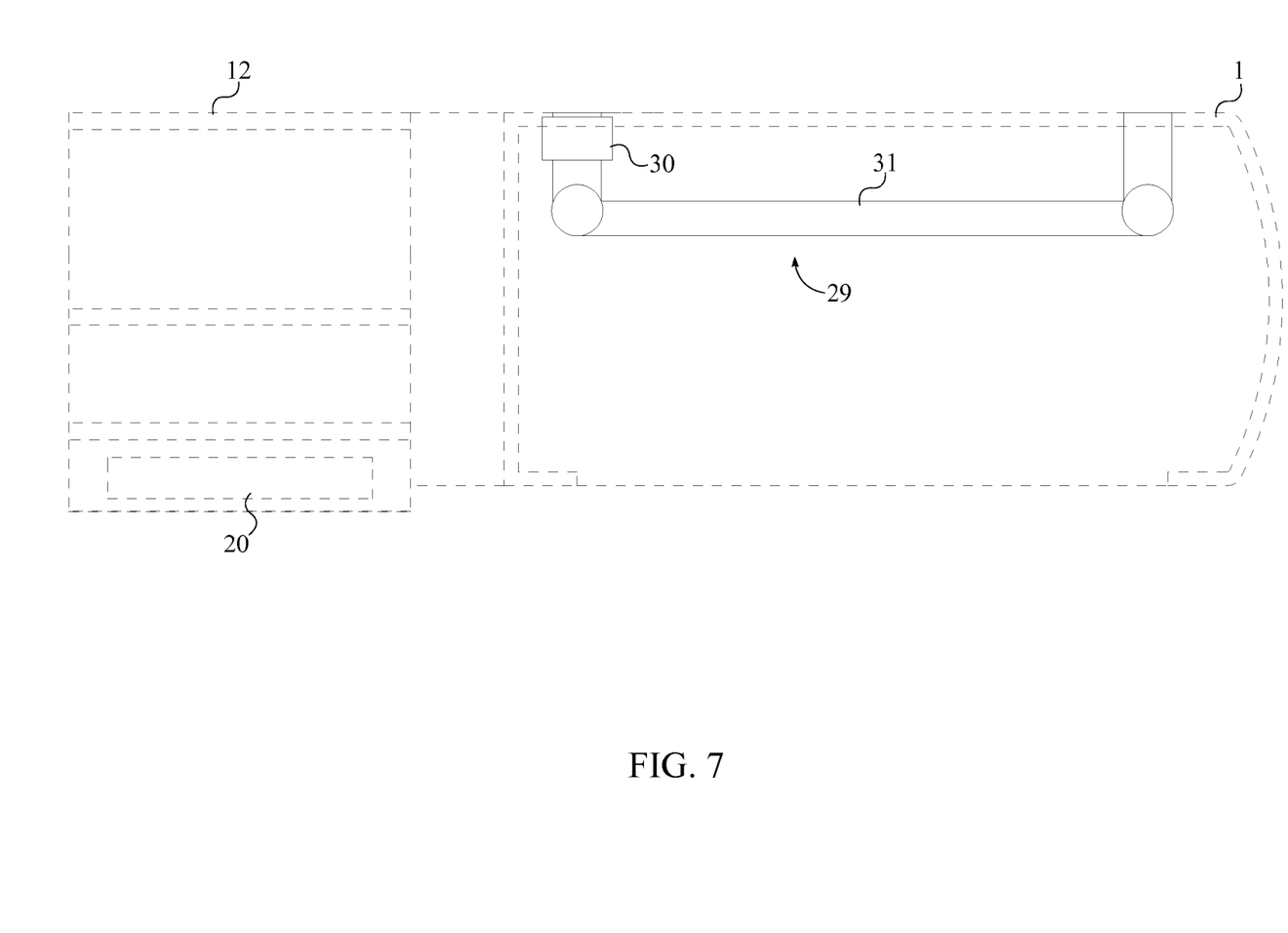
FIG. 7 is a top schematic view showing the ventilation system.

In reference to FIG. 2 and FIG. 7, the present invention further comprises at least one ventilation system 29 which is used to prevent the present invention from overheating and rapidly cool the present invention after the curing process has concluded. The at least one ventilation system 29 comprises a cooling fan 30 and an airflow duct 31. An inner surface 5 of the oven housing 1 is internally delineated by the lid 4, the lateral wall 3, and the base 2. An outer surface 6 of the oven housing 1 in externally delineated by the lid 4, the lateral portion and the base 2. The airflow duct 31 traverses through the oven housing 1 from the inner surface 5 to the outer surface 6. The airflow duct 31 provides a path for air to travel from inside the oven housing 1 to outside the oven housing 1. As a result, hot air from within the oven housing 1 may be replaced with cooler air. The cooling fan 30 is mounted within the airflow duct 31 and is used to force the flow of air through the oven housing 1. By increasing the airflow speed, the cooling fan 30 is able to increase the rate of convection, ultimately reducing the time needed to cool the components within the oven housing 1. The cooling fan 30 is electronically connected to the control unit 13 such that the speed of the cooling fan 30 may be regulated by the control unit 13.

Figure 10:
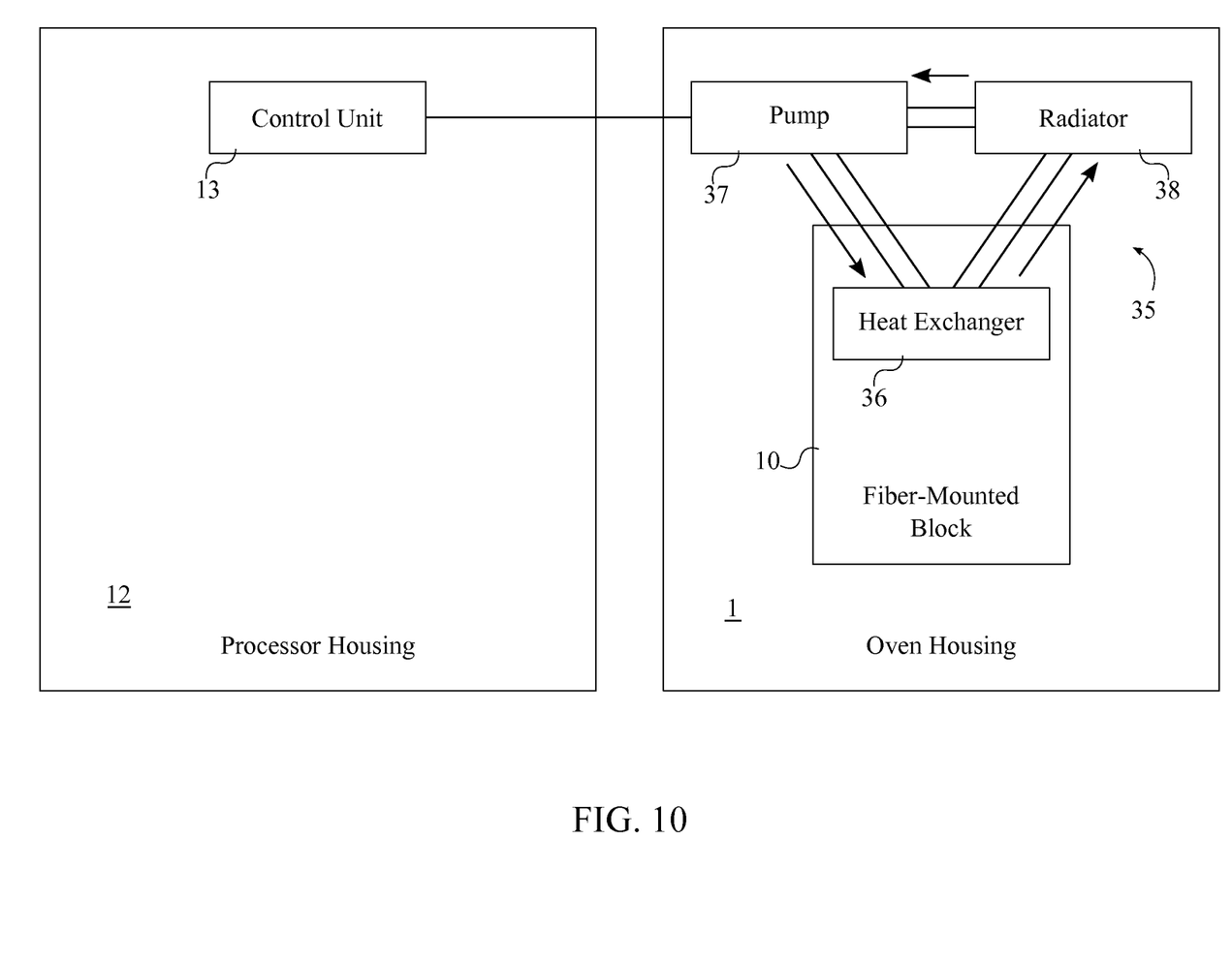
FIG. 10 is a schematic diagram showing the second embodiment of the present invention, wherein a liquid cooling system is used to cool the fiber-mounted block.

In an alternative embodiment of the present invention, a liquid cooling system 35 is used to cool down the fiber-mounting block 10 instead of or in addition to the at least one ventilation system. The liquid cooling system 35 comprises a heat exchanger 36, a pump 37, and a radiator 38. The pump 37 is electronically connected to the control unit 13 such that the user is able to activate the liquid cooling system 35. The heat exchanger 36 is externally mounted onto the fiber-mounting block 10 and is used to transfer heat from the fiber-mounting block 10 into a cooling liquid that is passed through the heat exchanger 36 by the pump 37. Alternatively, the heat exchanger 36 may be externally mounted onto the mounting plate 7 or internally mounted into the oven housing 1. The heat exchanger 36, the radiator 38, and the pump 37 are in cyclical fluid communication with each other such that the pump 37 is able to force a cooling liquid through the heat exchanger 36. The cooling liquid is heated by the fiber-mounting block 10 and passed into the radiator 38 which is used to cool down the cooling liquid. If the radiator 38 does not hold enough of the cooling liquid for the liquid cooling system 35 to run effectively, a reservoir may also be integrated amongst the cyclical fluid communication between the heat exchanger 36, the radiator 38, and the pump 37.

Figure 11:
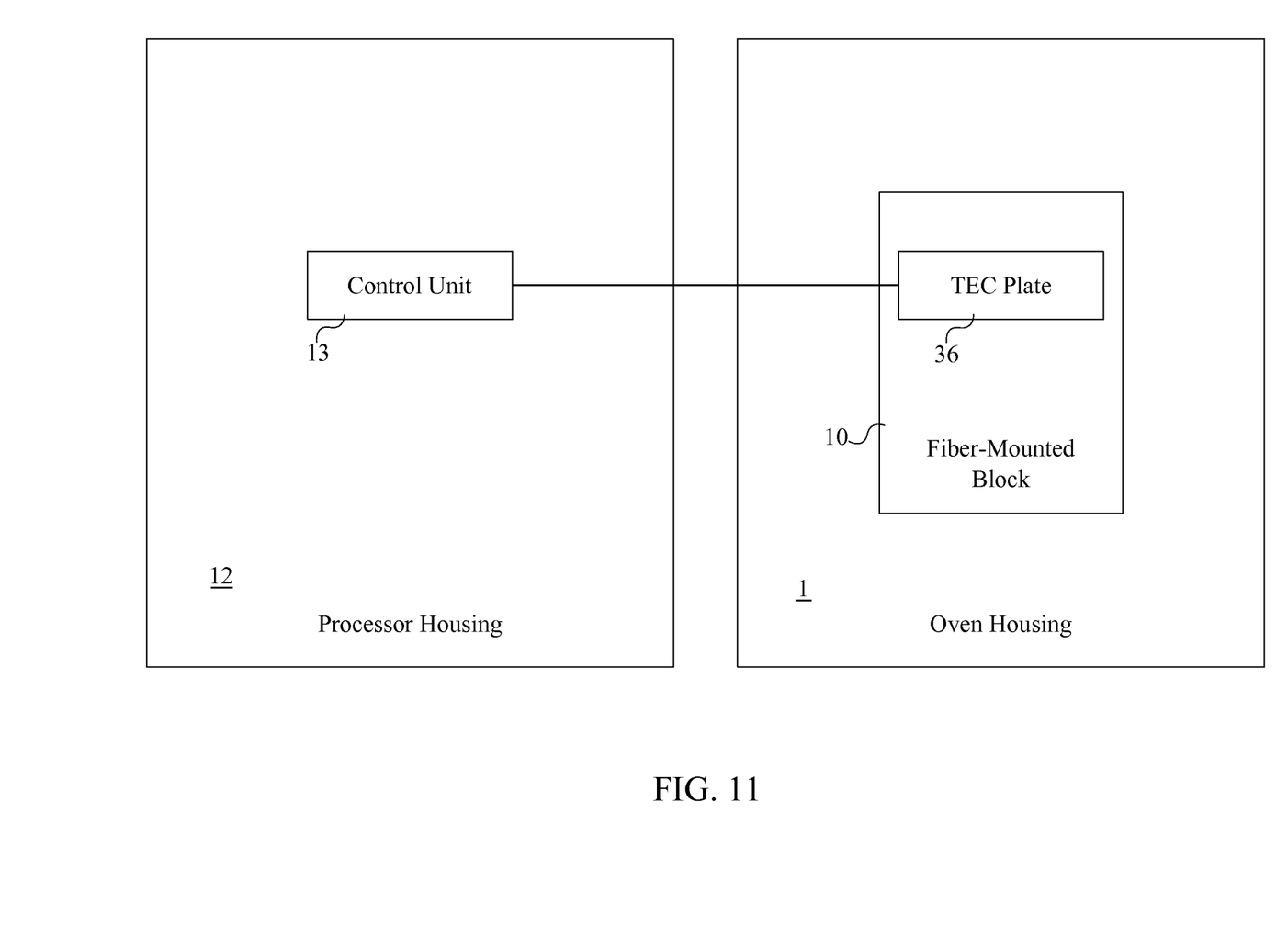
FIG. 11 is a schematic diagram showing the third embodiment of the present invention, wherein a TEC plate is used to cool the fiber-mounted block.

In a third embodiment of the present invention, at least one Thermoelectric Cooling (TEC) plate 39 is used to cool the fiber-mounting block 10. In this embodiment, the TEC plate 39 is externally mounted onto the fiber-mounting block 10 and is electronically connected to the control unit 13. Alternatively, the TEC plate 39 may be externally mounted onto the mounting plate 7 or internally mounted into the oven housing 1. The TEC plate 39 uses electrical energy supplied by the control unit 13 to transfer heat away from the fiber-mounting block 10.

In reference to FIG. 2 and FIG. 8, the present invention further comprises a plurality of network connection ports 32. The plurality of network connection ports 32 traverses into the processor housing 12 and are used to establish a means of communication between the present invention and the Internet or an external computer. Each of the plurality of network connection ports 32 are electronically connected to the control unit 13. In the preferred embodiment of the present invention, each of the plurality of network connection ports 32 are Local Area Network (LAN) ports, specifically, category 5 ports. However, alternative port types may be used in alternative embodiments of the present invention.

Similar to the plurality of network connection ports 32, the present invention further comprises a plurality of data transfer ports 33. The plurality of data transfer ports 33 traverses into the processor housing 12 and are used to transfer data between the present invention and external computers or memory devices. Each of the plurality of data transfer ports 33 are electronically connected to the control unit 13. In the preferred embodiment of the present invention, each of the plurality of data transfer ports 33 is Universal Serial Bus (USB) ports; however, additional port types may be used in alternative embodiments.

The present invention further comprises a power supply 34. The power supply 34 is electrically connected to the control unit 13. In the preferred embodiment of the present invention, the power supply 34 is a cable which may be connected into a standard wall outlet. In alternative embodiments of the present invention, the power supply 34 may be any other type of cable or may even be a battery.

Although the invention has been explained in relation to its preferred embodiment, it is to be understood that many other possible modifications and variations can be made without departing from the spirit and scope of the invention as hereinafter claimed.

What is claimed is:

1. An optical fiber curing oven comprises:
an oven housing;
a mounting plate;
a fulcrum;
a fiber-mounting block;
a heating element;
an processor housing;
a control unit;
the oven housing comprises a base, a lateral wall, and a lid;
the base being perimetrically and adjacently connected to the lateral wall;
the lid being hingedly and adjacently connected to the lateral wall, opposite to the base;
the processor housing being adjacently connected to the lateral wall;
the mounting plate being pivotably mounted onto the base by the fulcrum;
a rotation axis of the fulcrum being oriented parallel to the base;
the fiber-mounting block being attached upon the mounting plate, opposite to the base;
the heating element being embedded across the mounting plate;
the heating element being electronically connected to the control unit; and
the control unit being mounted within the processor housing.

2. The optical fiber curing oven as claimed in claim 1 comprises:
a first thermocouple;
the control unit comprises a processing unit and a proportional-integral-derivative (PID) temperature controller;
the processing unit being electronically coupled to the PID temperature controller;
the PID temperature controller being electronically coupled to the first thermocouple; and
the first thermocouple being embedded within the fiber-mounting block.

3. The optical fiber curing oven as claimed in claim 2 comprises:
a second thermocouple;
a toggle switch;
the toggle switch comprises an input, a first output, and a second output;
the second thermocouple being embedded within the mounting plate;
the PID temperature controller being electronically connected to the input;
the first output being electronically connected to the first thermocouple; and
the second output being electronically connected to the second thermocouple.

4. The optical fiber curing oven as claimed in claim 2 comprises:
a first electronic interface;
a second electronic interface;

the first electronic interface being integrated into the mounting plate;
the first electronic interface being electronically connected to the control unit;
the second electronic interface being integrated into the fiber-mounting block;
the second electronic interface being electronically connected to the first thermocouple; and
the first electronic interface and the second electronic interface being electronically engaged to each other.

5. The optical fiber curing oven as claimed in claim 1 comprises:
a user interaction system;
the user interaction system comprises a display screen, a speaker, and an indicator light;
the display screen being electronically connected to the control unit;
the speaker being electronically connected to the control unit;
the indicator light being electronically connected to the control unit; and
the display screen, the speaker, and the indicator light being mounted into the processor housing.

6. The optical fiber curing oven as claimed in claim 1 comprises:
a tilting handle;
a slit;
the tilting handle being adjacently connected to the mounting plate;
the tilting handle being oriented from the mounting plate at an obtuse angle;
the slit traversing into the oven housing; and
the tilting handle traversing through the slit.

7. The optical fiber curing oven as claimed in claim 1 comprises:
a rotational locking mechanism; and
the rotational locking mechanism being mechanically integrated between the fulcrum and the mounting plate.

8. The optical fiber curing oven as claimed in claim 1 comprises:
an access hatch;
an excess fiber opening;
the excess fiber opening traversing through the lid;
the access hatch being positioned adjacent to the excess fiber opening; and
the access hatch being slidably mounted against the lid.

9. The optical fiber curing oven as claimed in claim 1 comprises:
at least one ventilation system;
the at least one ventilation system comprises a cooling fan and an airflow duct;
an inner surface of the oven housing being internally delineated by the lid, the lateral wall, and the base;
an outer surface of the oven housing being externally delineated by the lid, the lateral portion, and the base;
the airflow duct traversing through the oven housing from the inner surface to the outer surface;
the cooling fan being mounted within the airflow duct; and
the cooling fan being electronically connected to the control unit.

10. The optical fiber curing oven as claimed in claim 1 comprises:
a plurality of network connection ports;
the plurality of network connection ports traversing into the processor housing; and
each of the plurality of network connection ports being electronically connected to the control unit.

11. The optical fiber curing oven as claimed in claim 1 comprises:
a plurality of data transfer ports;
the plurality of data transfer ports traversing into the processor housing; and
each of the plurality of data transfer ports being electronically connected to the control unit.

12. The optical fiber curing oven as claimed in claim 1 comprises:
a power supply; and
the power supply being electrically connected to the control unit.

* * * * *